United States Patent [19]

Harmon

[11] Patent Number: 4,659,486

[45] Date of Patent: * Apr. 21, 1987

[54] USE OF CERTAIN MATERIALS AS THINNERS IN OIL-BASED DRILLING FLUIDS

[75] Inventor: Bobby R. Harmon, Aberdeen, Scotland

[73] Assignee: Halliburton Company, Duncan, Okla.

[ * ] Notice: The portion of the term of this patent subsequent to Mar. 5, 2002 has been disclaimed.

[21] Appl. No.: 829,454

[22] Filed: Feb. 11, 1986

Related U.S. Application Data

[63] Continuation of Ser. No. 675,502, Nov. 28, 1984, abandoned, which is a continuation of Ser. No. 474,614, Mar. 11, 1983, Pat. No. 4,502,963.

[30] Foreign Application Priority Data

Nov. 3, 1982 [GB] United Kingdom ............... 8231375

[51] Int. Cl.$^4$ ............... C09K 3/00; C09K 9/00
[52] U.S. Cl. ............... 252/8.5; 252/8.55 R; 252/8.51; 252/8.551
[58] Field of Search ............... 252/8.5

[56] References Cited

U.S. PATENT DOCUMENTS

| | | | |
|---|---|---|---|
| 1,895,775 | 1/1933 | Smith | 106/277 |
| 2,094,609 | 10/1937 | Kritchevaky | 260/124 |
| 2,099,825 | 11/1937 | Rolshausen | 252/8.5 |
| 2,217,926 | 10/1940 | Van Campen | 252/8.5 M |
| 2,714,582 | 8/1955 | Day | 252/311.5 |
| 2,946,746 | 7/1960 | Keller | 252/8.5 |
| 2,994,660 | 8/1961 | Reddie et al. | 252/8.5 |
| 3,002,923 | 10/1961 | Barker | 252/8.5 |
| 3,021,277 | 2/1962 | Hoeppel | 252/8.5 |
| 3,108,068 | 10/1963 | Weiss et al. | 252/8.5 |
| 3,236,769 | 2/1965 | Burdyn | 252/8.5 |
| 3,244,638 | 4/1966 | Foley | 252/308 |
| 3,284,352 | 11/1966 | Burdyn | 252/8.5 |
| 3,396,105 | 8/1968 | Burdyn | 252/8.5 |
| 3,505,243 | 4/1970 | Steinberg | 252/353 |
| 3,525,397 | 8/1970 | Darley | 166/283 |
| 3,533,941 | 10/1970 | Freeland | 252/8.5 |
| 3,625,286 | 12/1971 | Parker | 166/291 |
| 3,649,543 | 3/1972 | Cahn et al. | 252/526 |
| 3,650,951 | 3/1972 | Marsh | 252/8.5 |
| 3,688,845 | 9/1972 | Messenger | 166/291 |
| 3,689,410 | 9/1972 | Darley et al. | 252/8.55 R |
| 3,778,287 | 12/1973 | Stansfield et al. | . |
| 3,850,248 | 11/1974 | Carney | 166/291 |
| 3,896,031 | 7/1975 | Carney | 252/8.5 C |
| 4,233,162 | 11/1980 | Carney | 252/8.5 C |
| 4,502,963 | 3/1985 | Harmon | 252/8.5 P |

FOREIGN PATENT DOCUMENTS

| | | | |
|---|---|---|---|
| 492097 | 4/1953 | Canada | 252/8.515 |
| 578341 | 6/1959 | Canada | 252/8.5 D |

Primary Examiner—Theodore Morris
Attorney, Agent, or Firm—Robert A. Kent

[57] ABSTRACT

An additive for use with a water-in-oil emulsion type fluid to reduce the viscosity of the fluid to a desired range comprising a fatty acid polyester containing at least 300 carbon atoms.

17 Claims, No Drawings

USE OF CERTAIN MATERIALS AS THINNERS IN OIL-BASED DRILLING FLUIDS

This application is a continuation of application Ser. No. 675,502, filed 11/28/84 now abandoned, which is a continuation of application Ser. No. 474,614, filed Mar. 11, 1983 now U.S. Pat. No. 4,502,963.

BACKGROUND OF THE INVENTION

1. Field of the Invention

The present invention relates to oil-external emulsions and, in particular, to the thinning of emulsions of the water-in-oil type in which an emulsifying agent comprising a fatty acid or an amine or an amide derivative of a fatty acid is utilized.

2. Description of the Prior Art

Oil-water emulsion type drilling fluids have been used advantageously in the oil well drilling industry for many years. Such emulsion drilling fluids possess many advantages over regular muds such as bringing about increased drilling rates, longer bit lives, improved hole conditions and the like. The most commonly used emulsion drilling fluids are oil-in-water types wherein oil is the dispersed phase and water the continuous phase. Inverted or water-in-oil emulsions wherein oil is the continuous phase and water is the dispersed phase also have been used to advantage.

The present invention relates to drilling fluids comprising such water-in-oil emulsions. Such drilling fluids require an emulsifying agent which functions to maintain the dispersion of the water in the oil and provide the proper rheological properties to the fluid to permit its use as a drilling fluid. The manner of utilizing drilling fluids and, in particular, those of the emulsion type is well known in the art and, therefore, hereafter only will be described in general terms.

In rotary drilling operations, a drilling fluid is pumped down the drill stem of the rotary rig and out through openings in the drill bit attached to the drill stem. The drilling fluid flows around the drill bit and returns to the surface through an annular passage between the drill stem and the walls of the well bore. The primary purpose of the drilling fluid is to cool and lubricate the drill bit and to carry the formation cuttings created by the drill bit away from the bit and up to the earth's surface.

In order to prevent the loss of fluid into porous or permeable formations traversed by the well bore, the fluid contains a suspended or dispersed solid material such as, clay or other suitable materials which will filter out upon the walls of the well bore to form an impermeable coating through which the liquid portion of the drilling fluid cannot pass. Also, in order that the fluid may exert a pressure against the walls of the well bore to prevent the collapse thereof, most of the drilling fluids presently employed are "weighted" by having suspended therein a high density solid such as barite, calcined clay, calcium carbonate, or the like. Heretofore, it has been difficult to achieve high apparent densities with conventional weighting materials and maintain fluid pumpability when the liquid portion of the fluid took the form of a water-in-oil emulsion. This arose out of the fact that such weighting materials were for the most part oleophobic, that is, they were not readily wet by the continuous oil phase of the emulsion, and hence tended to settle out of the fluid rather than remaining substantially uniformly suspended therein.

This problem has been at least partially solved in such emulsion-type drilling fluids by utilizing emulsifying agents comprising fatty acids or amine or amide derivatives of such fatty acids. Such emulsifying agents permit the weighting materials to be dispersed in the oil phase of the fluid.

A primary requirement of a drilling fluid is that the fluid must possess the desirable rheological properties when compounded and also must be able to retain these properties, within certain limits, during continued use of the fluid and particularly under conditions of elevated temperature bottom hole conditions.

As previously indicated, the drilling fluid removes cuttings from the well bore as drilling progresses. This process is governed by the velocity at which the fluid travels up the annulus of the well bore, as well as its viscosity or flow properties and its density. The cuttings removal efficiency usually increases with increasing viscosity and density. The viscosity depends upon the concentration, quality and state of dispersion of suspended colloidal solids in the drilling fluid. Continued use of a water-in-oil emulsion type drilling fluid normally results in an increase in the viscosity of the fluid because of an accumulation of colloidal drill cuttings in the fluid. Proper control of viscosity and gel strengths is essential for efficient cleaning of the well bore, suspension of the weighting material and cuttings when circulation is interrupted and to minimize pressure losses and swab or surge pressures when moving the drill string. The term "gel strength", as used herein, means the viscosity developed by the fluid upon standing for a period of time. The viscosity of a drilling fluid can be reduced by thinning the fluid. Thinning is obtained by reducing the plastic viscosity, yield point or gel strength or a combination of these properties of the drilling fluid. Thus, viscosity can be reduced by decreasing the solids content or the number of particles per unit of volume. Typically, this is achieved by diluting the drilling fluid with a liquid such as diesel fuel or the like in water-in-oil emulsions. While this reduces the viscosity of the fluid, it also has the undesirable effects of reducing the weight of the fluid and changing the oil:water volumetric ratio. Thus, additional weighting material then must be added to the drilling fluid to provide the desired fluid weight and the oil:water ratio adjusted before it can be recirculated through the drill bit.

It would be desirable to provide a chemical which can be utilized to reduce the viscosity of a drilling fluid and which does not adversely affect the other properties of the fluid.

SUMMARY OF THE INVENTION

The surprising discovery now has been made that a water-in-oil emulsion type drilling fluid returned from a well bore in a drilling operation can be treated with an additive comprising a fatty acid polyester whereby the viscosity of the fluid can be reduced without an undesirable change in the overall rheological properties of the fluid. The additive is admixed with the drilling fluid in an amount sufficient to reduce the viscosity of the fluid to a desired range without the necessity of diluting the drilling fluid.

DESCRIPTION OF THE PREFERRED EMBODIMENT

As previously indicated, the present invention provides a means of adjusting the rheological properties of a recirculated weighted oil-water emulsion-type drilling fluid. Characteristically, such compositions comprise a liquid suspending medium consisting of a water-in-oil emulsion, a fluid-loss additive which serves to prevent the escape of the suspending medium into permeable formations traversed by the well bore, and a weighting material to increase the density of the composition. When fatty acid emulsifying agents are employed in forming the emulsified liquid suspending medium it is found that the drilling fluid is stable to salt water contamination and has excellent fluid-loss properties. Moreover, the emulsifying agent has the property of rendering the surface of the weighting material readily wet by oil so that relatively large amounts of weighting materials can be stably suspended in the composition.

The emulsifying agent can comprise a fatty acid or an amine or an amide derivative of a fatty acid. Preferably, the emulsifying agent comprises a dimerized fatty acid.

Specific examples of suitable saturated fatty acids are capric, lauric, myristic, palmitic, stearic, and behenic acids. Suitable unsaturated fatty acids are monoethenoid acids, such as caproleic, lauroleic, myristoleic, palmitoleic, oleic, and cetoleic acids; diethanoid acids, such as linoleic acid; and triethenoid acids, such as linolenic acid. From a commercial standpoint, mixtures of fatty acids derived from tallow, tall oil, soybean oil, coconut oil, and cottonseed oil have been found to be suitable for the practice of this invention. Preferably, the emulsifying agent comprises dimerized oleic acid. Amine and amide derivatives of the fatty acids can be prepared by methods well known in the art. Specific examples of suitable derivates are di-oleyl quarternary amine and oleyl di-ethanol amide.

In preparing the drilling fluids compositions provided by the present invention, the liquid suspending medium may comprise 50-99 percent by volume of oil, 1-50 percent by volume of water, and 0.1-5 percent of the emulsifying agent (based on the combined weight of water and oil). The oil component is usually of mineral origin, that is, crude petroleum or a petroleum distillate or residuum fraction, and, preferably, comprises a blend of a relatively heavy oil such as a light tar, cracked residuum, heavy extract or the like and a light distillate such as gas oil or diesel fuel. Usually, such oil will have a gravity between about 12° an 40° API. The invention, however, is not limited to any particular type of oil or mixtures thereof.

The water component can be fresh water or a brine saturated or partially saturated with alkaline salts.

The fluid-loss component is sometimes a ground calcareous carbonate or argillaceous material, although asphalt, lignite, carbon black and any of the fluid-loss additives commonly employed in oil-continuous drilling fluids may be employed. Very frequently, local soils will contain sufficient clay to serve the purpose. The fluid-loss agent is employed in an amount sufficient to reduce the loss of suspending medium into permeable formations traversed by the well bore but insufficient to increase the viscosity of the composition to such a degree that it cannot readily be pumped. Such amount depends on the fluid-loss additive itself and upon the viscosity of the emulsion suspending medium, but usually corresponds to between about 2 and about 15 percent by weight of the suspending medium.

The weighting material component (if present) may be any of the high density materials conventionally employed for this purpose, such as, for example, barite, calcined clay, or the like and is employed in whatever amount is necessary to adjust the density of the composition to the desired value. Usually it is desirable that the composition have a weight of from about 6 to about 28 pounds per gallon.

While no particular order of mixing need be observed in preparing the drilling fluid emulsions, it is usually most convenient first to form the emulsion suspending medium and thereafter add the fluid-loss additive and weighting material. Preferably, the emulsifying agent is added to the oil, and the aqueous phase is then gradually incorporated with rapid agitation. If desired, the initial emulsion then may be passed through a colloidal mill or homogenizer, after which the fluid-loss additive is added with agitation. Finally, the weighting material is added and the entire composition is stirred to insure stable suspension of the solids in the liquid phase.

The drilling fluids of this invention can be used in any conventional manner for drilling wells. The fluid may be mixed in mud pits and pumped into the drill hole through the hollow drill stem of the rotary drilling equipment. The fluid leaving through holes in the drill bit which is attached to the drill stem contacts the walls of the well bore to form a filter cake which reduces fluid losses while simultaneously removing cuttings and performing other functions. The fluid may be returned to the pits via the annulus between the borehole and the drill stem. When at least a portion of the cuttings have been separated and any lost fluid replaced, the fluid is recycled to the well together with a quantity of an additive of the present invention to adjust the rheological properties of the drilling fluid to a desired range.

In accordance with the method of the present invention, an additive is provided which comprises one or more polyesters or a salt thereof derived from a hydroxycarboxylic acid of the formula: HO—X—COOH wherein X is a divalent saturated or unsaturated aliphatic radical containing at least 8 carbon atoms and in which there are at least 4 carbon atoms between the hydroxy and carboxylic acid groups, or from a mixture of such a hydroxycarboxylic acid and a carboxylic acid which is free from hydroxy groups or from any other appropriate starting compounds which will produce the desired polyester containing at least about 300 carbon atoms.

The additives can be obtained by any of the conventional and well-known methods of preparing such compounds. The additives of the present invention can be prepared, for example, by heating the hydroxycarboxylic acid or a mixture of such acids or a mixture of the hydroxycarboxylic acid and a carboxylic acid, or other appropriate compounds optionally in the presence of an esterification catalyst, at a temperature in the range of from about 160° to about 200° C., until the required molecular weight polyester has been obtained. The water formed in the esterification reaction is removed from the reaction medium, and this can be conveniently done by passing a stream of nitrogen over the reaction mixture, or preferably, by carring out the reaction in the presence of a solvent, such as mineral oil, toluene or xylene, and distilling off the water as it is formed.

The resulting polyesters then can be isolated in conventional manner; however, when the reaction is carried out in the presence of an organic solvent whose presence would not be harmful in the drilling fluid, then the resulting solution of the polyester can be used.

The salts of the polyesters can be either salts of the polyesters with metal atoms or salts with bases such as ammonia or organic derivates thereof. The metal salts conveniently can be obtained, for example, by heating the polyester with an oxide, hydroxide or carbonate of the metal at elevated temperatures, for example at temperatures in the region of 200° C., the reaction being perferably carried out in an inert atmosphere. As examples of the said metals, there may be mentioned alkali metals such as lithium, sodium and potassium, alkaline earth metals such as calcium and barium, and magnesium lead, zinc, and copper.

In the said hydroxycarboxylic acids, the radical represented by X preferably contains from 12 to 20 carbon atoms, and it further is preferred that there are between 8 and 14 carbon atoms between the carboxylic acid and hydroxy groups. It also is preferred that the hydroxy group is a secondary hydroxy group.

As specific examples of such hydroxycarboxylic acids, there may be mentioned ricinoleic acid, a mixture of 9- and 10-hydroxystearic acids (obtained by sulphation of oleic acid followed by hydrolysis), and 12-hydroxystearic acid, and especially the commercially available hydrogenated castor oil fatty acid which contains, in addition to 12-hydroxystearic acid, minor amounts of stearic acid and palmitic acid.

The carboxylic acids which can be used in conjunction with the hydroxycarboxylic acids to obtain the polyesters are preferably carboxylic acids of saturated or unsaturated aliphatic compounds, particularly alkyl and alkenyl carboxylic acids containing a chain of from 8 to 20 carbon atoms. As examples of such acids, there may be mentioned lauric acid, palmitic acid, stearic acid and oleic acid.

The additive of the present invention is admixed with the recirculated drilling fluid in an amount sufficient to reduce the viscosity of the fluid to a desired range. Typically, the amount of additive admixed with the drilling fluid during a single treatment of the fluid will be in the range of from about 0.1 to about 1 pound per barrel of the drilling fluid. Preferably, the additive is admixed with the drilling fluid in an amount of from about 0.1 to about 0.5 pounds per barrel of drilling fluid. While larger quantities of the additive can be used, economics and the potential of overtreatment resulting in additional expense to restore the desired rheological properties dictate the quantity of additive used. The additive also can be admixed in similar amounts with a freshly compounded drilling fluid to adjust the rheological properties of such a drilling fluid prior to use.

In the event an excessive quantity of the additive is admixed with the drilling fluid resulting in a substantial loss of viscosity and gel strength, the fluid can be returned to the desired range of rheological properties by admixture with a quantity of amine-treated bentonite or any other suitable organophiliic clay. As previously indicated, such treatment increases the cost of the drilling fluid.

Surprisingly, it has been found that addition of the additive has a substantially linear effect upon the viscosity of the drilling fluid once a certain threshhold concentration is achieved in the fluid. The particular threshold concentration varies with the compositions of the drilling fluid. While no upper limit presently is known to exist, the effect of the additive has been found generally to level off above a concentration level of about 0.75 pounds per barrel of drilling fluid such that further addition of the additive is economically undesirable.

The drilling fluid can be treated with the additive whenever the rheological properties have changed sufficiently that a correction is considered necessary. Thus, when a fluid is to be used in the drilling of a well for an extended period of time, for example, it may be necessary to treat the fluid with the additive of the present invention from about two or three times to cover a dozen times. Such treatments do not result in any undesirable effect upon the other properties of the drilling fluid.

The following examples illustrate the formation and preparation of several emulsion-type drilling fluids within the scope of the present invention but are not to be construed as limiting the same.

EXAMPLE I

Several fatty acid polyesters are prepared by admixing the acids designated in Table I in the proportions shown together with a portion of mineral oil and then heating them for various lengths of time at a temperature in the range of from about 190° C. to 200° C. to form the polyester comprising the additive of the present invention. Water is distilled off the mixture as it is formed.

TABLE I

| Formulation | Amount Present in Mixture, gms. | | | |
|---|---|---|---|---|
| | Ricinoleic Acid | Oleic Acid | 12-hydroxy-stearic Acid | Mineral Oil |
| A | 90 | 10 | 0 | 11 |
| B | 80 | 20 | 0 | 11 |
| C | 50 | 50 | 0 | 11 |
| D | 100 | 0 | 0 | 11 |
| E | 0 | 10 | 90 | 11 |
| F | 0 | 50 | 50 | 11 |
| G | 0 | 0 | 100 | 11 |

The various formulations are admixed with an alkyl amide and mineral oil in the following percentages by weight: 12% fatty acid polyester, 5% alkyl amide and 83% mineral oil to form a solution of the additive. The various samples of the additive of the present invention then are admixed with a number of drilling fluid samples employing fatty acid emulsifying agents to determine the effect the additive has upon the rheological properties of the drilling fluid. The solutions of the additive are added to the drilling fluid at a rate of 2 pounds per barrel of drilling fluid. The rheological properties are determined in accordance with API RP 13B "Standard Procedure for Testing of Drilling Fluids". The data is set forth in Tables II through IX, below. Table IX provides data relating to the effects the unpolymerized fatty acids, alkyl amide and mineral oil have upon the rheological properties of a drilling fluid.

The following abbreviations are used in the Tables:
PV—Plastic viscosity;
YP—Yield point; and
VB—Voltage breakdown.

TABLE II

| | Additive Formulation A | | | | | |
|---|---|---|---|---|---|---|
| | Heating Time of Formulation (Hrs.) | | | | | |
| | Control | 3.5 | 7.0 | 11.0 | 13.5 | 22.0 |
| INITIAL PROPERTIES: 150° F. | | | | | | |
| 600 rpm | 75 | 61 | 63 | 60 | 58 | 60 |
| 300 rpm | 44 | 32 | 31 | 33 | 31 | 32 |
| PV, cp | 31 | 29 | 32 | 27 | 28 | 28 |
| YP, #/100 ft² | 13 | 3 | 0 | 6 | 4 | 4 |
| 10 Sec. Gel, #/100 ft² | 18 | 5 | 3 | 6 | 4 | 7 |
| 10 Min. Gel, #/100 ft² | 27 | 20 | 13 | 20 | 17 | 20 |
| VB | 240 | 360 | 480 | 460 | 440 | 480 |

TABLE II-continued

Additive Formulation A

| | Heating Time of Formulation (Hrs.) | | | | |
|---|---|---|---|---|---|
| | Control | 3.5 | 7.0 | 11.0 | 13.5 | 22.0 |

16 Hr. HOT-ROLLED PROPERTIES: 150° F.

| | Control | 3.5 | 7.0 | 11.0 | 13.5 | 22.0 |
|---|---|---|---|---|---|---|
| 600 rpm | 70 | 61 | 62 | 57 | 61 | 65 |
| 300 rpm | 41 | 31 | 31 | 28 | 31 | 32 |
| PV, cp | 29 | 30 | 31 | 29 | 30 | 30 |
| YP, #/100 ft$^2$ | 12 | 1 | 0 | 0 | 1 | 2 |
| 10 Sec. Gel, #/100 ft$^2$ | 19 | 2 | 2 | 1 | 1 | 4 |
| 10 Min. Gel, #/100 ft$^2$ | 27 | 17 | 16 | 18 | 11 | 20 |
| VB | 440 | 320 | 420 | 300 | 300 | 320 |

16 Hr. STATIC-AGED PROPERTIES: 300° F., 300 psi

| | Control | 3.5 | 7.0 | 11.0 | 13.5 | 22.0 |
|---|---|---|---|---|---|---|
| 600 rpm | 65 | 70 | 87 | 81 | 66 | 70 |
| 300 rpm | 41 | 48 | 53 | 47 | 36 | 42 |
| PV, cp | 24 | 31 | 36 | 34 | 30 | 28 |
| YP, #/100 ft$^2$ | 17 | 17 | 17 | 13 | 6 | 14 |
| 10 Sec. Gel, #/100 ft$^2$ | 11 | 13 | 12 | 10 | 3 | 9 |
| 10 Min. Gel, #/100 ft$^2$ | 29 | 29 | 31 | 23 | 10 | 23 |
| VB | 260 | 230 | 320 | 280 | 320 | 320 |

TABLE III

Additive Formulation B

| | Heating Time of Formulation (Hrs.) | | | |
|---|---|---|---|---|
| | Control | 8.0 | 12.0 | 22.0 |

INITIAL RHEOLOGICAL PROPERTIES: 150° F.

| | Control | 8.0 | 12.0 | 22.0 |
|---|---|---|---|---|
| 600 rpm | 66 | 57 | 58 | 61 |
| 300 rpm | 38 | 28 | 29 | 29 |
| PV, cp | 28 | 29 | 29 | 32 |
| YP, #/100 ft$^2$ | 10 | 0 | 0 | 0 |
| 10 Sec. Gel, #/100 ft$^2$ | 11 | 1 | 1 | 3 |
| 10 Min. Gel, #/100 ft$^2$ | 24 | 3 | 3 | 13 |
| VB | 285 | 320 | 330 | 340 |

16 Hr. HOT-ROLLED PROPERTIES: 150° F.

| | Control | 8.0 | 12.0 | 22.0 |
|---|---|---|---|---|
| 600 rpm | 66 | 45 | 46 | 51 |
| 300 rpm | 38 | 21 | 23 | 25 |
| PV, cp | 28 | 24 | 23 | 26 |
| YP, #/100 ft$^2$ | 10 | 0 | 0 | 0 |
| 10 Sec. Gel, #/100 ft$^2$ | 13 | 1 | 1 | 1 |
| 10 Min. Gel, #/100 ft$^2$ | 24 | 1 | 1 | 13 |
| VB | 380 | 420 | 425 | 380 |

16 Hr. STATIC-AGED PROPERTIES: 300° F., 300 psi

| | Control | 8.0 | 12.0 | 22.0 |
|---|---|---|---|---|
| 600 rpm | 61 | 51 | 50 | 66 |
| 300 rpm | 37 | 28 | 27 | 38 |
| PV, cp | 24 | 23 | 23 | 28 |
| YP, #/100 ft$^2$ | 13 | 5 | 4 | 10 |
| 10 Sec. Gel, #/100 ft$^2$ | 11 | 4 | 6 | 7 |
| 10 Min. Gel, #/100 ft$^2$ | 25 | 15 | 18 | 23 |
| VB | 310 | 550 | 600 | 620 |

TABLE IV

Additive Formulation C

| | Heating Time of Formulation (Hrs.) | | |
|---|---|---|---|
| | Control | 7.0 | 22.0 |

INITIAL RHEOLOGICAL PROPERTIES: 150° F.

| | Control | 7.0 | 22.0 |
|---|---|---|---|
| 600 rpm | 65 | 54 | 66 |
| 300 rpm | 39 | 26 | 39 |
| PV, cp | 26 | 28 | 27 |
| YP, #/100 ft$^2$ | 13 | 0 | 12 |
| 10 Sec. Gel, #/100 ft$^2$ | 18 | 3 | 15 |
| 10 Min. Gel, #/100 ft$^2$ | 28 | 10 | 31 |
| VB | 420 | 540 | 560 |

16 Hr. HOT-ROLLED PROPERTIES: 150° F.

| | Control | 7.0 | 22.0 |
|---|---|---|---|
| 600 rpm | 68 | 61 | 61 |
| 300 rpm | 43 | 30 | 38 |
| PV, cp | 25 | 31 | 27 |
| YP, #/100 ft$^2$ | 18 | 0 | 11 |
| 10 Sec. Gel, #/100 ft$^2$ | 20 | 1 | 18 |
| 10 Min. Gel, #/100 ft$^2$ | 32 | 13 | 31 |
| VB | 440 | 420 | 440 |

16 Hr. STATIC-AGED PROPERTIES: 300° F., 300 psi

TABLE IV-continued

Additive Formulation C

| | Heating Time of Formulation (Hrs.) | | |
|---|---|---|---|
| | Control | 7.0 | 22.0 |
| 600 rpm | 74 | 75 | 75 |
| 300 rpm | 42 | 43 | 44 |
| PV, cp | 32 | 32 | 31 |
| YP, #/100 ft$^2$ | 10 | 11 | 13 |
| 10 Sec. Gel, #/100 ft$^2$ | 9 | 12 | 12 |
| 10 Min. Gel, #/100 ft$^2$ | 28 | 26 | 26 |
| VB | 380 | 340 | 300 |

TABLE V

Additive Formulation D

| | Heating Time of Formulation (Hrs.) | | | |
|---|---|---|---|---|
| | Control | 3.5 | 7.0 | 11.0 |

INITIAL RHEOLOGICAL PROPERTIES: 150° F.

| | Control | 3.5 | 7.0 | 11.0 |
|---|---|---|---|---|
| 600 rpm | 74 | 63 | 60 | 59 |
| 300 rpm | 42 | 32 | 30 | 30 |
| PV, cp | 32 | 31 | 30 | 29 |
| YP, #/100 ft$^2$ | 10 | 1 | 0 | 1 |
| 10 Sec. Gel, #/100 ft$^2$ | 16 | 1 | 1 | 2 |
| 10 Min. Gel, #/100 ft$^2$ | 26 | 13 | 14 | 19 |
| VB | 420 | 470 | 540 | 400 |

16 Hr. HOT-ROLLED PROPERTIES: 150° F.

| | Control | 3.5 | 7.0 | 11.0 |
|---|---|---|---|---|
| 600 rpm | 74 | 63 | 60 | 59 |
| 300 rpm | 42 | 32 | 30 | 30 |
| PV, cp | 32 | 31 | 30 | 29 |
| YP, #/100 ft$^2$ | 10 | 1 | 0 | 1 |
| 10 Sec. Gel, #/100 ft$^2$ | 16 | 1 | 1 | 2 |
| 10 Min. Gel, #/100 ft$^2$ | 26 | 13 | 14 | 19 |
| VB | 420 | 470 | 540 | 400 |

16 Hr. STATIC-AGED PROPERTIES: 300° F., 300 psi

| | Control | 3.5 | 7.0 | 11.0 |
|---|---|---|---|---|
| 600 rpm | 73 | 85 | 83 | 73 |
| 300 rpm | 42 | 54 | 50 | 40 |
| PV, cp | 31 | 31 | 33 | 33 |
| YP, #/100 ft$^2$ | 11 | 23 | 17 | 7 |
| 10 Sec. Gel, #/100 ft$^2$ | 9 | 14 | 13 | 9 |
| 10 Min. Gel, #/100 ft$^2$ | 30 | 34 | 24 | 22 |
| VB | 380 | 380 | 320 | 400 |

TABLE VI

Additive Formulation E

| | Heating Time of Formulation (Hrs.) | | | | |
|---|---|---|---|---|---|
| | Control | 4.0 | 7.5 | 10 | 14 | 24 |

INITIAL PROPERTIES: 150° F.

| | Control | 4.0 | 7.5 | 10 | 14 | 24 |
|---|---|---|---|---|---|---|
| 600 rpm | 59 | 47 | 49 | 45 | 47 | 49 |
| 300 rpm | 36 | 24 | 24 | 22 | 23 | 23 |
| PV, cp | 23 | 23 | 25 | 23 | 24 | 26 |
| YP, #/100 ft$^2$ | 13 | 1 | 0 | 0 | 0 | 0 |
| 10 Sec. Gel, #/100 ft$^2$ | 12 | 2 | 2 | 1 | 1 | 1 |
| 10 Min. Gel, #/100 ft$^2$ | 22 | 14 | 12 | 7 | 11 | 10 |
| VB | 420 | 450 | 480 | 480 | 440 | 430 |

16 Hr. HOT-ROLLED PROPERTIES: 150° F.

| | Control | 4.0 | 7.5 | 10 | 14 | 24 |
|---|---|---|---|---|---|---|
| 600 rpm | 60 | 51 | 48 | 50 | 52 | 52 |
| 300 rpm | 36 | 25 | 23 | 25 | 26 | 26 |
| PV, cp | 24 | 26 | 25 | 25 | 26 | 26 |
| YP, #/100 ft$^2$ | 12 | 0 | 0 | 0 | 0 | 0 |
| 10 Sec. Gel, #/100 ft$^2$ | 15 | 1 | 2 | 2 | 1 | 1 |
| 10 Min. Gel, #/100 ft$^2$ | 21 | 14 | 12 | 9 | 9 | 12 |
| VB | 380 | 400 | 460 | 450 | 450 | 560 |

16 Hr. STATIC-AGED PROPERTIES: 300° F. 300 psi

| | Control | 4.0 | 7.5 | 10 | 14 | 24 |
|---|---|---|---|---|---|---|
| 600 rpm | 73 | 66 | 70 | 65 | 64 | |
| 300 rpm | 40 | 37 | 37 | 34 | 34 | |
| PV, cp | 33 | 29 | 33 | 31 | 30 | |
| YP, #/100 ft$^2$ | 7 | 8 | 4 | 3 | 4 | |
| 10 Sec. Gel, #/100 ft$^2$ | 7 | 7 | 4 | 4 | 4 | |
| 10 Min. Gel, #/100 ft$^2$ | 22 | 19 | 20 | 19 | 17 | |
| VB | 320 | 300 | 325 | 300 | 320 | |

TABLE VII

Additive Formulation F

| | | Heating Time of Formulation (Hrs.) | | | | |
|---|---|---|---|---|---|---|
| | Control | 5.0 | 10.0 | 12.5 | 15 | 24 |
| INITIAL PROPERTIES: 150° F. | | | | | | |
| 600 rpm | 60 | 61 | 62 | 63 | 60 | 61 |
| 300 rpm | 36 | 32 | 32 | 34 | 33 | 34 |
| PV, cp | 24 | 28 | 30 | 29 | 27 | 27 |
| YP, #/100 ft$^2$ | 12 | 5 | 2 | 5 | 6 | 7 |
| 10 Sec. Gel, #/100 ft$^2$ | 9 | 3 | 4 | 3 | 3 | 4 |
| 10 Min. Gel, #/100 ft$^2$ | 21 | 19 | 18 | 16 | 17 | 19 |
| VB | 280 | 320 | 300 | 290 | 380 | 340 |
| 16. Hr. HOT-ROLLED PROPERTIES: 150° F. | | | | | | |
| 600 rpm | 60 | 61 | 60 | 58 | 64 | 60 |
| 300 rpm | 34 | 32 | 31 | 30 | 33 | 33 |
| PV, cp | 26 | 29 | 29 | 28 | 31 | 27 |
| YP, #/100 ft$^2$ | 8 | 3 | 2 | 2 | 2 | 6 |
| 10 Sec. Gel, #/100 ft$^2$ | 8 | 4 | 5 | 7 | 4 | 7 |
| 10 Min. Gel, #/100 ft$^2$ | 18 | 17 | 19 | 19 | 20 | 21 |
| VB | 340 | 300 | 350 | 380 | 350 | 325 |

TABLE VIII

Additive Formulation G

| | | Heating Time of Formulation (Hrs.) | | | | |
|---|---|---|---|---|---|---|
| | Control | 3.5 | 7.5 | 12 | 14.5 | 24 |
| INITIAL PROPERTIES: 150° F. | | | | | | |
| 600 rpm | 59 | 47 | 48 | 49 | 47 | 51 |
| 300 rpm | 36 | 23 | 24 | 25 | 23 | 28 |
| PV, cp | 23 | 24 | 24 | 24 | 24 | 23 |
| YP, #/100 ft$^2$ | 13 | 0 | 0 | 0 | 0 | 5 |
| 10 Sec. Gel, #/100 ft$^2$ | 12 | 2 | 2 | 2 | 2 | 5 |
| 10 Min. Gel, #/100 ft$^2$ | 22 | 14 | 14 | 14 | 10 | 17 |
| VB | 420 | 360 | 420 | 380 | 380 | 400 |
| 16 Hr. HOT-ROLLED PROPERTIES: 150° F. | | | | | | |
| 600 rpm | 60 | 51 | 48 | 48 | 47 | 50 |
| 300 rpm | 36 | 25 | 24 | 23 | 22 | 27 |
| PV, cp | 24 | 26 | 24 | 25 | 25 | 23 |
| YP, #/100 ft$^2$ | 12 | 0 | 0 | 0 | 0 | 4 |
| 10 Sec. Gel, #/100 ft$^2$ | 15 | 1 | 2 | 1 | 1 | 2 |
| 10 Min. Gel, #/100 ft$^2$ | 21 | 14 | 14 | 11 | 12 | 16 |
| VB | 320 | 340 | 300 | 350 | 560 | 340 |
| 16 Hrs. STATIC-AGED PROPERTIES: 300° F., 300 psi | | | | | | |
| 600 rpm | 73 | | 59 | 60 | 66 | 61 |
| 300 rpm | 40 | | 28 | 30 | 33 | 30 |
| PV, cp | 33 | | 28 | 30 | 33 | 31 |
| YP, #/100 ft$^2$ | 7 | | 0 | 0 | 0 | 0 |
| 10 Sec. Gel, #/100 ft$^2$ | 7 | | 2 | 2 | 1 | 2 |
| 10 Min. Gel, #/100 ft$^2$ | 22 | | 14 | 12 | 14 | 16 |
| VB | 320 | | 340 | 300 | 350 | 560 |

TABLE IX

| | Reference Compounds | | | | | |
|---|---|---|---|---|---|---|
| | Control | a | b | c | d | e |
| INITIAL PROPERTIES: 150° F. | | | | | | |
| 600 rpm | 75 | 64 | 74 | 64 | 74 | 58 |
| 300 rpm | 44 | 36 | 44 | 35 | 43 | 34 |
| PV, cp | 31 | 28 | 30 | 29 | 31 | 24 |
| YP, #/100 ft$^2$ | 13 | 8 | 14 | 6 | 12 | 10 |
| 10 Sec. Gel, #/100 ft$^2$ | 18 | 12 | 18 | 16 | 17 | 11 |
| 10·Min. Gel, #/100 ft$^2$ | 27 | 23 | 27 | 23 | 28 | 24 |
| VB | 240 | 420 | 320 | 320 | 330 | 350 |
| 16 Hr. HOT-ROLLED PROPERTIES: 150° F. | | | | | | |
| 600 rpm | 70 | 54 | 64 | 55 | 65 | 57 |
| 300 rpm | 41 | 28 | 37 | 29 | 38 | 33 |
| PV, cp | 29 | 26 | 27 | 26 | 27 | 24 |
| YP, #/100 ft$^2$ | 12 | 2 | 10 | 3 | 11 | 9 |
| 10 Sec. Gel, #/100 ft$^2$ | 19 | 4 | 16 | 5 | 17 | 9 |
| 10 Min. Gel, #/100 ft$^2$ | 27 | 21 | 26 | 21 | 26 | 23 |
| VB | 440 | 300 | 380 | 350 | 370 | 340 |
| 16 Hr. STATIC-AGED PROPERTIES: 300° F., 300 psi | | | | | | |
| 600 rpm | 65 | 66 | 79 | 65 | 69 | 73 |
| 300 rpm | 39 | 38 | 45 | 37 | 35 | 41 |
| PV, cp | 26 | 28 | 34 | 28 | 30 | 32 |
| YP, #/100 ft$^2$ | 13 | 10 | 11 | 9 | 9 | 9 |
| 10 Sec. Gel, #/100 ft$^2$ | 11 | 8 | 11 | 6 | 5 | 8 |
| 10 Min. Gel, #/100 ft$^2$ | 27 | 24 | 27 | 25 | 25 | 26 |
| VB | 260 | 300 | 420 | 320 | 380 | 320 |

$^a$Unpolymerized ricinoleic acid, alkyl amide and mineral oil in ratio of 12:5:83 by weight
$^b$Unpolymerized oleic acid, alkyl amide and mineral oil in ratio of 12:5:83 by weight
$^c$Unpolymerized oleic and ricinoleic acid in ratio of 50:50 by weight together with alkyl amide and mineral oil in ratio of 12:5:83 by weight
$^d$Mineral oil and alkyl amide in ratio of 83:5 by weight
$^e$Unpolymerized 12-OH—stearic acid, alkyl amide and mineral oil in ratio of 12:5:83 by weight The data of Tables II through IX clearly illustrate the effectiveness of the additive of the present invention in reducing the viscosity and gel strength of the drilling fluids which would permit such fluids to be treated with quantities of the additive to maintain the rheological properties of the drilling fluid in desired ranges.

EXAMPLE II

To determine the effect the concentration of the additive has upon the drilling fluid, two of the solutions of the additive of Example I were compared at various concentration levels in samples of a drilling fluid. The data is set forth in Table X, below.

TABLE X 16 hr. HOT-ROLLED RHEOLOGICAL PROPERTIES: 150° F.

| | Additive Solution Concentration, Pounds per Barrel | | | | | | | |
|---|---|---|---|---|---|---|---|---|
| | 6.0 | 4 | 2 | 1.5 | 1.0 | .5 | .25 | 0 |
| Sample 1 | | | | | | | | |
| 600 rpm | 68 | 68 | 69 | 69 | 69 | 70 | 71 | 75 |
| 300 rpm | 35 | 36 | 37 | 38 | 42 | 43 | 46 | 49 |
| PV, cp | 33 | 32 | 32 | 31 | 27 | 27 | 25 | 26 |
| YP, #/100 ft$^2$ | 2 | 4 | 5 | 7 | 15 | 16 | 21 | 23 |
| 10 Sec. Gel, #/100 ft$^2$ | 3 | 3 | 3 | 9 | 15 | 25 | 27 | 24 |
| 10 Min. Gel, #/1000 ft$^2$ | 5 | 5 | 11 | 20 | 29 | 29 | 30 | 29 |
| VB | 590 | 580 | 620 | 500 | 500 | 550 | 480 | 400 |
| Sample 2 | | | | | | | | |
| 600 rpm | 62 | 62 | 68 | 68 | 69 | 70 | 71 | 75 |
| 300 rpm | 28 | 31 | 34 | 35 | 40 | 43 | 46 | 49 |
| PV, cp | 34 | 31 | 34 | 33 | 29 | 27 | 25 | 26 |
| YP, #/100 ft$^2$ | 0 | 0 | 0 | 2 | 11 | 16 | 21 | 23 |
| 10 Sec. Gel, #/100 ft$^2$ | 1 | 2 | 2 | 2 | 14 | 22 | 25 | 24 |
| 10 Min. Gel, #/100 ft$^2$ | 2 | 3 | 7 | 11 | 22 | 28 | 30 | 29 |
| VB | 500 | 520 | 510 | 510 | 500 | 528 | 550 | 400 |

Sample 1: Ricinoleic acid:oleic acid in 90:10 ratio by weight heated 13.5 hours admixed with alkyl amide and mineral oil in ratio of 12:5:83 by weight
Sample 2: 12-hydroxystearic acid heated 14.5 hours admixed with alkyl amide and mineral oil in ratio of 12:5:83 by weight The data clearly illustrates the effect the concentration of the additive has upon the rheological properties of the drilling fluid.

While that which presently is considered to be the preferred embodiments of the invention has been described herein, changes or modifications in the methods may be made by an individual skilled in the art, without departing from the spirit or scope of the invention as set forth in the appended claims.

What is claimed is:

1. A method of treating a returned drilling fluid comprising a water-in-oil emulsion to reduce the viscosity of said returned fluid comprising:

admixing said returned fluid containing colloidally suspended formation particles with an additive comprising a fatty acid polyester in an amount sufficient to reduce the viscosity of said returned fluid, said fatty acid polyester being derived from at least one member selected from the group consisting of 12 hydroxystearic acid and an admixture of ricinoleic acid and oleic acid.

2. The method of claim 1 wherein said additive is admixed in an amount of from about 0.1 to about 1 pound per barrel of returned fluid.

3. The method of claim 1 wherein said additive is admixed in an amount of form about 0.1 to about 0.5 pounds per barrel of returned fluid.

4. The method of claim 1 wherein said additive is derived by reaction of said acid in mineral oil.

5. The method of claim 1 wherein said polyester is derived from an admixture of ricinoleic acid and oleic acid present in a ratio by weight of about 80:20.

6. A method of treating a water-in-oil emulsion type drilling fluid wherein said emulsion is formed with an emulsifying agent comprising a fatty acid or an amine or an amide derivative thereof to reduce the viscosity and gel strength of said fluid comprising:

admixing said fluid with an additive comprising a fatty acid polyester in an amount of from about 0.1 to about 1 pound per barrel of drilling fluid, said fatty acid polyester being derived from at least one member selected from the group consisting of 12 hydroxystearic acid and an admixture of ricinoleic acid and oleic acid.

7. The method of claim 6 wherein said drilling fluid contains a weighting material.

8. The method of claim 6 wherein said additive is present in an amount of from about 0.1 to about 0.5 pounds per barrel.

9. The method of claim 6 wherein said additive is derived by reaction of said acid in mineral oil.

10. The method of claim 6 wherein said polyester in said drilling fluid is derived from an admixture of ricinoleic acid and oleic acid present in a ratio by weight of about 80:20.

11. A water-in-oil emulsion type drilling fluid comprising water, oil, an emulsifying agent comprising at least one member selected from the group consisting of a fatty acid, an amine derivative of a fatty acid and an amide derivative of a fatty acid; a weighting material, a fluid-loss additive and an additive comprising a fatty acid polyester present in an amount of from about 0.1 to about 1 pound per barrel of said drilling fluid, said fatty acid polyester being derived from at least one member selected from the group consisting of 12 hydroxystearic acid and an admixture of ricinoleic acid and oleic acid.

12. The fluid of claim 11 wherein said additive is dissolved in a hydrocarbon carrier fluid.

13. The fluid of claim 11 wherein said weighting material comprises barite.

14. The fluid of claim 11 wherein the oil to water ratio, by volume, is in the range of from about 99:1 to about 1:1.

15. The fluid of claim 13 wherein said fluid-loss additive comprises at least one member selected from the group comprising an asphaltic material, a lignite material, an argillaceous material and a calcareous material.

16. The method of claim 11 wherein said polyester in said drilling fluid is derived from an admixture of ricinoleic acid and oleic acid present in a ratio by weight of about 80:20.

17. The method of claim 11 wherein said fatty acid polyester contains at least 300 carbon atoms.

* * * * *